(12) United States Patent
Kurpanek (10) Patent No.: US 6,772,270 B1
(45) Date of Patent: Aug. 3, 2004

(54) MULTI-PORT FIBRE CHANNEL CONTROLLER

(75) Inventor: Dietmar M. Kurpanek, Sunnyvale, CA (US)

(73) Assignee: Vicom Systems, Inc., Redwood City, CA (US)

( * ) Notice: Subject to any disclaimer, the term of this patent is extended or adjusted under 35 U.S.C. 154(b) by 0 days.

(21) Appl. No.: 09/501,881

(22) Filed: Feb. 10, 2000

(51) Int. Cl.⁷ .............................................. G06F 13/42
(52) U.S. Cl. ...................... 710/316; 710/305; 385/100
(58) Field of Search .................... 710/316, 62, 300, 710/100, 105, 5, 305; 709/200, 230; 711/4, 114; 714/6, 5; 370/463–465, 395.5, 402, 221; 385/100

(56) References Cited

U.S. PATENT DOCUMENTS

| | | | |
|---|---|---|---|
| 5,745,701 A | 4/1998 | Nguyen-Thai et al. . | 395/200.79 |
| 5,768,623 A | 6/1998 | Judd et al. ................. | 395/857 |
| 5,809,328 A * | 9/1998 | Nogales et al. ................ | 710/5 |
| 5,935,205 A | 8/1999 | Murayama et al. ......... | 709/216 |
| 5,978,379 A | 11/1999 | Chan et al. ................. | 370/403 |
| 6,014,383 A | 1/2000 | McCarty ..................... | 370/453 |
| 6,108,694 A | 8/2000 | Yashiro et al. ............. | 709/216 |
| 6,128,750 A | 10/2000 | Espy et al. .................... | 714/7 |
| 6,148,004 A * | 11/2000 | Nelson et al. | |
| 6,148,414 A | 11/2000 | Brown et al. .................. | 714/9 |
| 6,192,027 B1 * | 2/2001 | El-Batal | |
| 6,202,115 B1 | 3/2001 | Khosrowpour .............. | 710/129 |
| 6,219,753 B1 * | 4/2001 | Richardson | |
| 6,233,702 B1 | 5/2001 | Horst et al. ................... | 714/48 |
| 6,400,730 B1 * | 6/2002 | Latif et al. | |

* cited by examiner

Primary Examiner—Gopal C. Ray
(74) Attorney, Agent, or Firm—Campbell Stephenson Ascolese LLP; Samuel G Campbell, III (57) ABSTRACT

A multi-port Fibre Channel controller is disclosed. Such a multi-port Fibre Channel controller includes a number of Fibre Channel ports, an interface unit coupled to each one of the Fibre Channel ports, a Fibre Channel controller, and a processor. The processor is coupled to the Fibre Channel controller, and the Fibre Channel controller is coupled to control the interface unit and coupled to the subsystem interface. Such a multi-port Fibre Channel controller may be configured as a dual-port Fibre Channel controller by, for example, employing only two Fibre Channel ports (i.e., a first Fibre Channel port and a second Fibre Channel port).

57 Claims, 7 Drawing Sheets

MULTI-PORT FIBRE CHANNEL CONTROLLER

BACKGROUND OF THE INVENTION

1. Field of the Invention

The present invention relates to computer subsystem communications, and, more particularly, to a method and apparatus for coupling a Fibre Channel controller with more than one host computer system, storage router, or the like.

2. Description of the Related Art

Modern computers often include a number of different subsystems, each performing one or more functions necessary to the computer's operation. For example, computers normally include storage subsystems for storing operating system programs, application programs and data, and the like. As computers' processing capabilities have increased, the need for increasingly sophisticated, scalable and flexible access to these storage subsystems has become an important issue.

This need has led to the development of what is commonly referred to as a 'Storage Area Network' (SAN). Within a SAN, host computers provide access to arrays of storage devices that can be either local or remotely located, and can be either centralized in one location or distributed over many. This architectural variability and the complexity of such storage subsystems mandates that the host computers be coupled to devices that can route requests to the storage devices and make their actual configuration transparent to the end-user (i.e. 'storage routers'). This added layer between the end-user and data stored on the storage devices de-couples the end-user from the SAN's architecture.

Historically, host systems have been connected to storage devices using storage routers that are dedicated to mapping the storage devices' location and configuration and providing transparent access to the end-user. While the host system is generally neither aware of nor dependent upon having such information, such access should be provided in a reliable and immediate fashion. The storage routers ensure such functionality by mapping the architecture of the storage devices, storing this information and subsequently providing for ready access by the host system. To ensure reliability, redundant access is often supported, employing multiple routing devices. Also, in order to make such an arrangement scalable across geographic locations, the routing devices must themselves be interconnected by a more conventional device such as an hub.

The aforementioned configuration is not without problems. Specifically, the necessity of coupling hubs to the storage routers complicates the implementation of a SAN. First, such an architecture impacts the ability of users to flexibly scale the SAN. External hubs are produced with a relatively large number of ports so that architectures employing such hubs can be readily expanded without the need for additional external hubs. For example, external hubs normally provide a minimum of eight ports. If an installation requires fewer ports, or if growth is patterned in such a way that multiples other than eight are desirable, an unavoidable waste of capacity (in terms of ports) results. Second, cost is increased because no matter how small the installation, more than one external hub is required to provide the necessary connectivity. Third, compatibility issues are raised by the introduction of external hubs into the SAN architecture. This is the case any time the products of third-party vendors must be installed in a network's architecture. The installation and subsequent maintenance of such a system is also further complicated, due at least in part to the need to support the products of multiple vendors. Finally, as more devices are employed in the SAN's architecture, the more likely it is that one device will perform poorly relative to the remaining devices and so create a bottleneck in the SAN's throughput.

It is therefore desirable to introduce greater simplicity into the hardware used to communicate between a host system and storage array, while meeting the prerequisites of redundancy and reliability. Preferably, such an architecture also provides improved performance and reduces the SAN's overall cost.

SUMMARY OF THE INVENTION

The present invention provides a computer-subsystem configuration that allows Fibre Channel devices, for example a storage router, to coupled to more than one such device or host computer. The present invention can reside, for example, in a storage router (e.g.,a SAN router) as a subsystem of the storage router.

A configuration according to the present invention provides multi-port coupling capability to the storage router containing such a multi-port Fibre Channel controller. This allows the device to be coupled to more than one host and/or other Fibre Channel storage routers. In another configuration, a dual-port Fibre Channel controller is provided. This allows the device to be coupled to more than one host; or to a host and another Fibre Channel storage router; or to two other Fibre Channel storage routers, for example. Among other advantages, this provides the ability to 'daisy-chain' Fibre Channel devices (i.e. attach multiple devices in series with one another in an unbroken chain), to construct a 'loop' configuration (i.e., attach multiple devices in series with one another, and two of the devices to, for example, a host), or to configure other topologies. Such options provide several benefits, among them redundancy within the device chain.

Notably, embodiments of the present invention allow these configuration options without the use of an external hub device. This is a significant improvement over a single-port configuration. An external hub is required to interconnect current Fibre Channel storage routers. This dependency is problematic for a number of reasons, which include scalability, flexibility, cost, compatibility of devices and the creation of bottlenecks. By removing the need for such devices in a SAN's architecture, the dual-port storage router configuration considerably simplifies and strengthens the host systems' ability to access storage devices in a reliable and efficient manner.

In one embodiment of the present invention, a multi-port Fibre Channel controller is disclosed. Such a multi-port Fibre Channel controller includes a number of Fibre Channel ports, an interface unit coupled to each one of the Fibre Channel ports, a Fibre Channel controller and a processor. The processor is coupled to the Fibre Channel controller, and the Fibre Channel controller is coupled to control the interface unit and coupled to the subsystem interface. Such a multi-port Fibre Channel controller may be configured as a dual-port Fibre Channel controller by, for example, employing only two Fibre Channel ports (i.e., a first Fibre Channel port and a second Fibre Channel port).

In another embodiment of the present invention, a method of operating a multi-port Fibre Channel controller is disclosed. Such a multi-port Fibre Channel controller includes a number of ports, as described above, and may contain other of the features and elements of the multi-port Fibre Channel controller described above. The method begins by determining a state of an interface controller. Next, one of the ports is configured. The interface controller is associated with the port, where the port is one of the number of ports. Next, a determination is made as to whether the interface controller is receiving a Fibre Channel signal that is valid. The interface controller is preferably configured to receive the Fibre Channel signal, for example. The port is then enabled if the Fibre Channel signal is valid. If desirable, the multiport Fibre Channel controller may be made to perform an initialization procedure, such as a loop initialization procedure.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
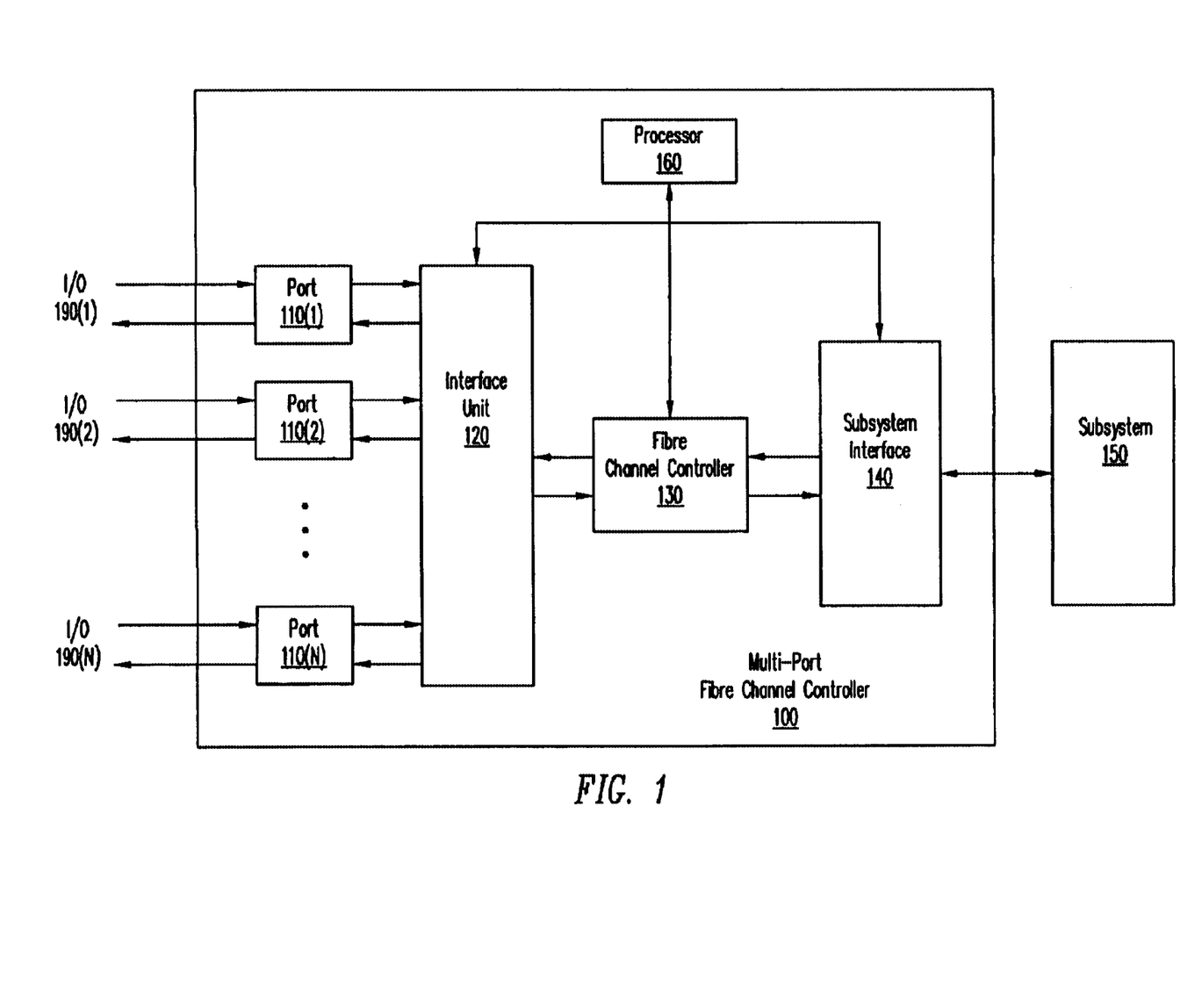
FIG. 1 is a block diagram illustrating generally a multi-port Fibre Channel controller according to an embodiment of the present invention.

The following is intended to provide a detailed description of an example of the invention and should not be taken to be limiting of the invention itself. Rather, any number of variations may fall within the scope of the invention which is defined in the claims following the description.
Introduction The present invention provides a computer-subsystem configuration that allows Fibre Channel devices, for example storage routers, to couple with more than one such device or host computer. A multi-port Fibre Channel controller according to the present invention provides multi-port coupling capability to a storage router containing such a Fibre Channel controller. This capability allows a number of architectural possibilities for the Fibre Channel network (more specifically, a Storage Area Network (SAN)) in which such a storage router is employed. Namely, such storage routers can be coupled, for example, to more than one host; or to a host and another Fibre Channel storage router; or to two other storage routers; or in another such configuration. This flexibility allows the devices to be placed in a number of configurations, including 'daisy-chain' and 'loop' configurations, both of which improve SAN redundancy and scalability. Of at least equal importance, however, embodiments of the present invention provide these options without recourse to the use of an external hub, as is presently required. This is advantageous for a number of reasons, including cost, flexibility, compatibility of devices, scalability, avoidance of bottlenecks and other such reasons.
Exemplary Multi-Port Fibre Channel Controller FIG. 1 illustrates a Fibre Channel controller according to the present invention. A multi-port Fibre Channel controller 100 is depicted that includes ports 110(1)–(N). It will be noted that the term port and Fibre Channel port are used interchangeably herein. Ports 110(1)–(N) are coupled by an interface unit 120 to a Fibre Channel controller 130, which is in turn coupled to a subsystem interface 140. Subsystem interface 140 couples Fibre Channel controller 130 (and so, multi-port Fibre Channel controller 100) to a subsystem 150. Thus, Fibre Channel controller 130 interconnects the subsystem interface 140 (and so subsystem 150) with interface unit 120 and ports 110(1–N). A processor 160 is coupled to control the various subsystems of multi-port Fibre Channel controller 100, such as one or more of interface unit 120, Fibre Channel controller 130 and subsystem interface 140. Multi-port Fibre Channel controller 100 may be coupled within, for instance, a storage router (not shown) and allow the storage router to communicate with subsystem 150, subsystem 150 being coupled to the storage router via subsystem interface 140.

It will be noted that the variable identifier "N" is used in several instances in FIG. 1 to more simply designate the final element (e.g., ports 110(1)–(N)) of a series of related or similar elements (e.g., ports 110). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., subsystem interface contained within multi-port Fibre Channel controller 100). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Returning now to FIG. 1, an aspect of interest in embodiments of the present invention is the multiplicity of Fibre Channel ports provided by such a system, depicted in FIG. 1 as ports 110(1) to 100(N) that reside on the Fibre Channel controller device 100. Each of these ports can provide access to its own bi-directional I/O data link (depicted in FIG. 1 as I/Os 190(1)–(N)). For example, port 110(1) provides access to I/O 190(1), which has an incoming data link and an outgoing data link. Similarly, port 110(2) provides access to I/O 190(2), and so on. These I/O data links provide the mechanism by which host requests for access to the resources of the SAN can be received and passed on to the storage devices and communication between storage routers can take place.

The provision of multiple Fibre Channel ports is advantageous for a number of reasons, including scalability, the avoidance of bottlenecks, device compatibility, cost, flexibility, and other such criteria. By including multiple Fibre Channel ports in a multi-port Fibre Channel controller of the present invention, a SAN architecture employing multiple Fibre Channel controllers is simplified and enjoys other economies. Because external hubs are only available in configurations supporting a relatively large number of ports (e.g., 8 or more), SAN architectures in need of either a small number of ports (less than that provided by the external hub used) or a number of ports that is not a multiple of that provided by the external hub will necessarily waste ports. Moreover, the addition of presently-available Fibre Channel controllers may necessitate the addition of external hubs, complicating installation of the additional Fibre Channel controllers. A multi-port Fibre Channel controller of the present invention allows a Fibre Channel network's interconnectivity to scale with the addition of such multi-port Fibre Channel controllers, without wasting resources.

The use of external hubs of different makes may also incur different throughput rates at different points in the network, giving rise to a situation where the SAN's throughput is limited by a single (or small number of) external hub(s), thus creating a bottleneck at the external hub(s) in question. In fact, the use of external hubs of different makes also gives rise to the possibility of compatibility problems, both between the external hubs of different makes, and between one or more of the external hubs and the Fibre Channel controllers, as well as the need to maintain different manufacturers' products. Moreover, a minimal increase in unit cost of the Fibre Channel controller is encountered when employing a multi-port Fibre Channel controller architecture of the present invention, while avoiding the relatively large additional cost of an external hub (as well as the cost of unused ports, as described previously), thus reducing the overall system cost. As is explained subsequently, the ability to switch between the use of one port and two ports also allows a multi-port Fibre Channel controller according to the present invention to be flexibly configured in response to the needs of the SAN being constructed.

Figure 2:
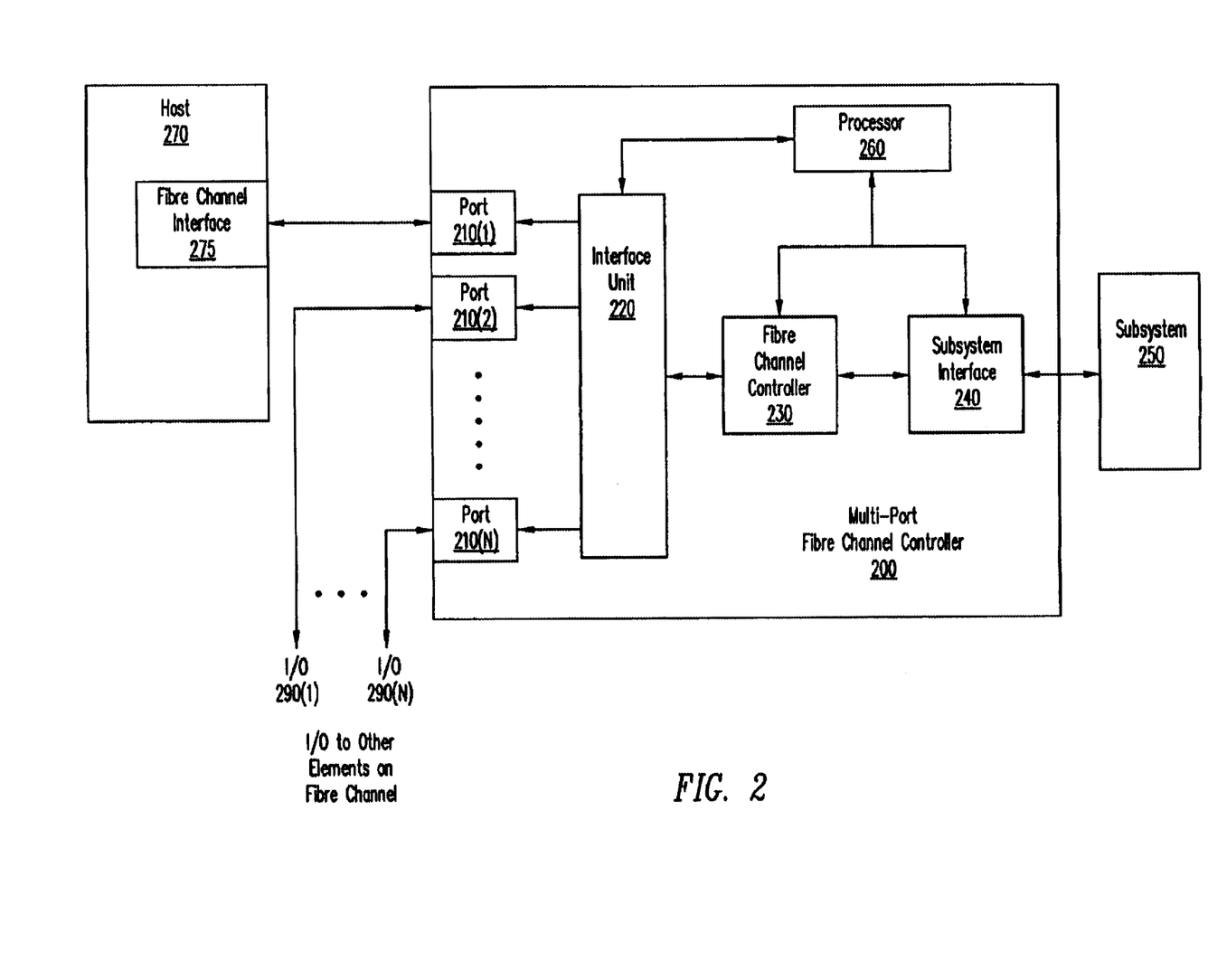
FIG. 2 is a block diagram illustrating an embodiment of the present invention including couplings to a host system.

FIG. 2 depicts a block diagram illustrating the manner in which an embodiment of the present invention can be coupled with a host system. As in FIG. 1, a multi-port Fibre Channel controller 200 is configured to operate in an environment such as that depicted in FIG. 2. Multi-port Fibre Channel controller 200 includes ports 210(1)–(N). Ports 210(1)–(N) are coupled by an interface unit 220 to a Fibre Channel controller 230, which is in turn coupled to a subsystem interface 240. Subsystem interface 240 couples Fibre Channel controller 230 (and so, multi-port Fibre Channel controller 200) to a subsystem 250. Subsystem 250 may be, for example, a storage subsystem such as a hard disk drive, tape storage unit, CD-RW unit, CD-ROM, ZIP drive, or such other storage unit as may be necessary and appropriate to the given storage application. A processor 260 is coupled to control the various subsystems of multi-port Fibre Channel controller 200, such as one or more of interface unit 220, Fibre Channel controller 230 and subsystem interface 240. As before, multi-port Fibre Channel controller 200 may be coupled within, for instance, a storage router (not shown) and allow the storage router to communicate with subsystem 250, subsystem 250 being coupled to the storage router via subsystem interface 240.

In the SAN architecture depicted in FIG. 2, port 210(1) of multi-port fiber channel controller device 200 is employed to coupled multi-port fiber channel controller device 200 to host system 270 via a Fibre Channel interface 275 installed in host system 270. The other I/O ports (ports 210(2–N)) on Fibre Channel controller 200 can then be coupled to other elements on the Fibre Channel architecture, including, but not necessarily limited to, other host systems and other storage routers. It will be noted that, as is shown in FIG. 2, this functionality is provided without the use of an external hub.

Exemplary Dual-Port Fibre Channel Controller

Figure 3:
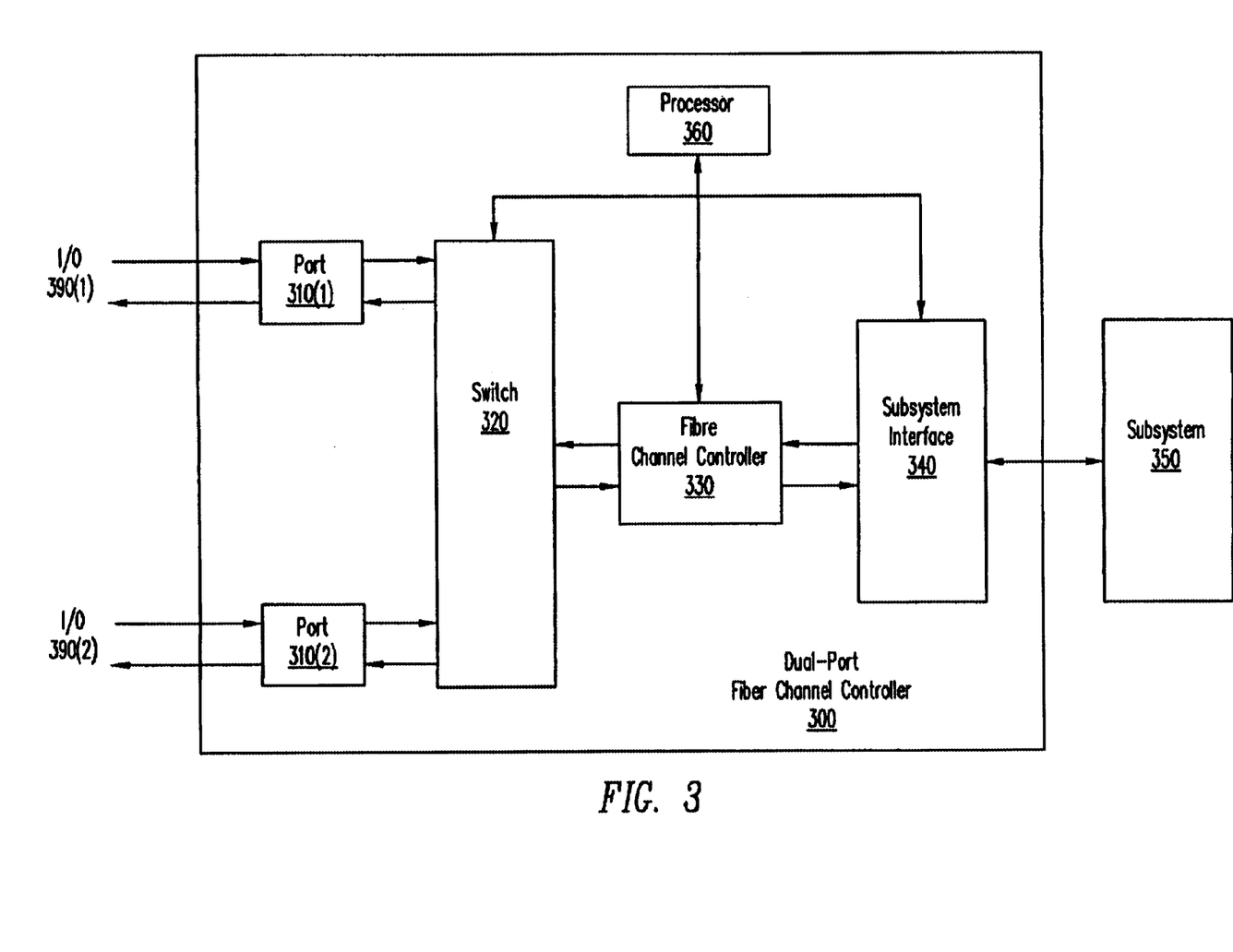
FIG. 3 is a block diagram illustrating another embodiment of a multi-port Fibre Channel controller according to the present invention.

FIG. 3 is a block diagram illustrating a dual-port Fibre Channel controller according to the present invention. Although the invention allows for the support of multiple Fibre Channel ports coupled to a single Fibre Channel controller, a dual-port Fibre Channel controller is a particularly useful embodiment of a multi-port Fibre Channel controller according to the present invention. Most elements of such a dual-port Fibre Channel controller can be similar to those in a multi-port device such as that depicted in FIG. 1. Thus, as before, a dual-port fiber channel controller device 300 can include two Fibre Channel ports (ports 310(1) and 310(2)), a switch 320, a Fibre Channel controller 330, a subsystem interface 340 (coupled to a subsystem 350) and a processor 360.

Subsystem interface 340 enables dual-port fiber channel controller 300 to communicate with the subsystem coupled to the storage router (e.g., subsystem 350). Fibre Channel controller 330 couples subsystem interface 340 to switch 320, and so to ports 310(1) and 310(2). Each of these ports provides access to a separate I/O link, I/O 390(1) and I/O 390(2), respectively. Such an embodiment of the present invention provides the several advantages previously set forth, as well as advantages specific to a dual-port embodiment of the present invention. For example, the provision of a two ports in a dual-port fiber channel controller such as dual-port fiber channel controller 300 allows for ready support of "daisy-chain," "loop" and other such topologies.

Figure 4:
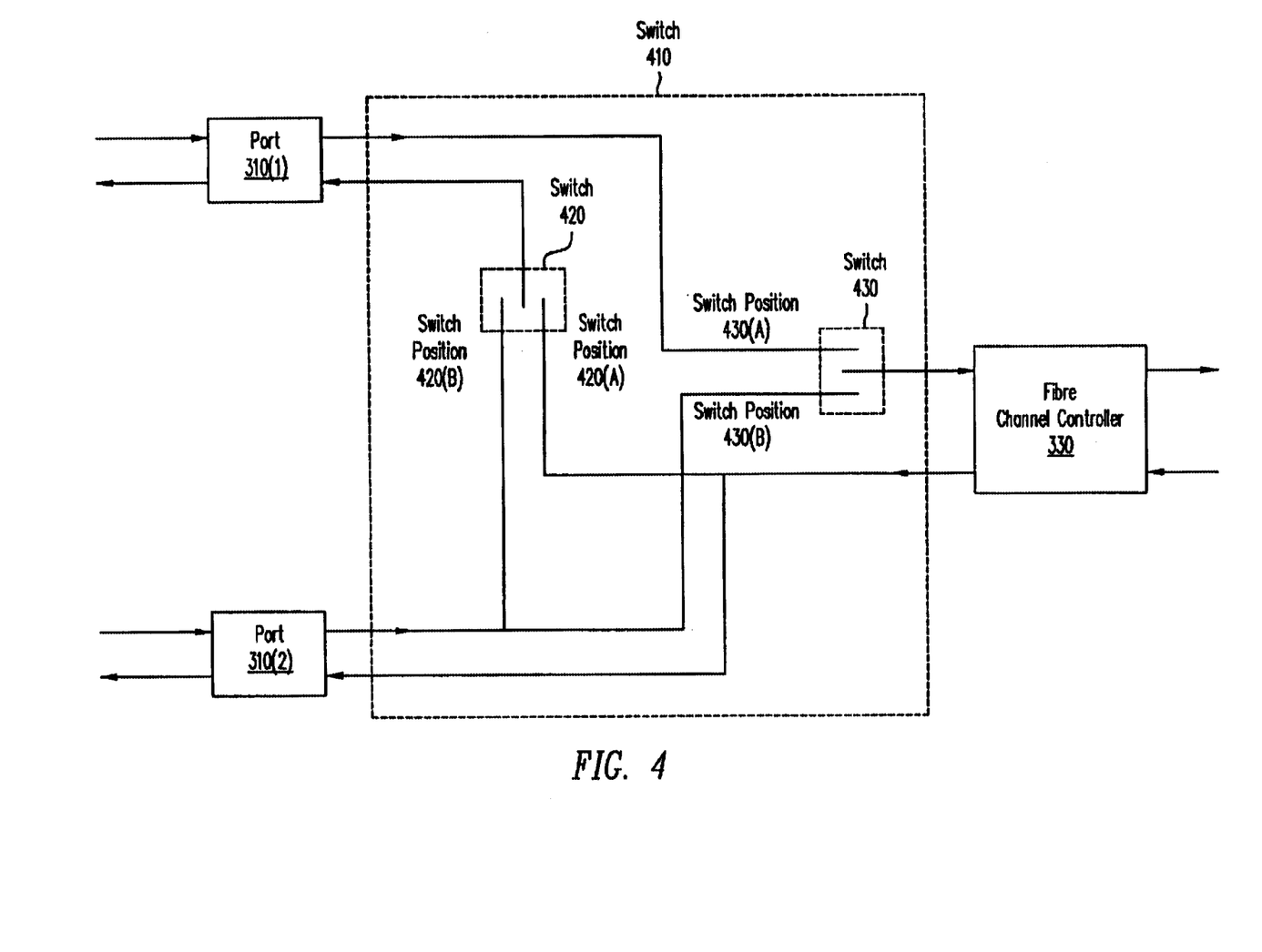
FIG. 4 is a block diagram illustrating an example of a switch device used in an embodiment of a multi-port Fibre Channel controller according to the present invention.

FIG. 4 depicts an example of switch 320, a switch 410, that can be used to control the operation of the dual ports in FIG. 3 (ports 310(1) and 310(2)). The configuration depicted in FIG. 4 not only illustrates one possible configuration of switch 320, but also illustrates a configuration that has particular utility in regard to the use of commercially-available Fibre Channel cabling, as explained below. In FIG. 4, port 310(1) (also referred to herein as 'port 1') and port 310(2) (also referred to herein as 'port 2') are coupled to Fibre Channel controller 330 by switch 410. Switch 410 includes two switches (switches 420 and 430). In the configuration shown in FIG. 4, switches 420 and 430 provide three possible states: 'both ports active', 'only port 1 active' and 'only port 2 active'. The positions of the two switches (switches 420 and 430) determine these states. In particular, both port 1 and port 2 will be active only if switch 420 is in position 420(B) and switch 430 is in position 430(A). If switch 420 is in position 420(A) and switch 430 is in position 430(A), then only port 1 will be active. Conversely, if switch 430 is in position 430(B), only port 2 will be active, regardless of the position of switch 420.

The above configuration of switch 410, and the connections thus provided between ports 310(1) and 310(2), and Fibre Channel controller 330 provide several advantages in addition to those mentioned previously regarding a multi-port fiber channel controller according to the present invention. The configuration of switch 410 allows ports 310(1) and 310(2) to be used singlely (i.e., the states 'only port 1 active' and 'only port 2 active') or in combination (i.e., the state 'both ports active'). This allows dual-port fiber channel controller 300 to be configured to operate in a point-to-point SAN architecture (in which only one of ports 310(1) and 310(2) is active), or to operate in a daisy-chain SAN architecture (or loop or similar SAN architecture; in which both of ports 310(1) and 310(2) are active). This flexibility is provided without the use of an external hub, and allows the same dual-port fiber channel controller to be used to construct either a point-to-point or chained topology by simply setting a switch and connecting the dual-port fiber channel controller accordingly.

As a preliminary matter, a dual-port Fibre Channel controller such as described herein is useful for Fibre Channel Arbitrated Loop (FC-AL) configurations, among other configurations, and may be used to construct arbitrated loops containing any number of storage routers and either one or two other single-ported FC-AL devices, for example, without the need for one or more external hubs. As noted, in the absence of a Fibre Channel controller supporting an embodiment of the present invention, an external (and in this case, FC-AL) hub is required to construct any loop containing more than two ports (e.g., a port on the host and a port on a storage router). Thus, the degenerate case of the FC-AL configuration is a point-to-point configuration.

This ability to configure dual-port fiber channel controller 300 also permits the use of standard, commercially-available Fibre Channel cables in either configuration. Standard Fibre Channel cables actually consist of two fibers, normally associated with an inbound link and an outbound link. In a point-to-point configuration, a single Fibre Channel cable is used to couple a host (e.g., host 270) to a storage router (not shown) by coupling the outbound link of the host's Fibre Channel interface (e.g., Fibre Channel interface 275) to the inbound link of a Fibre Channel port on the storage router (e.g., port 310(1) or port 310(2)), and vice versa.

By configuring switch 410 to allow ports 310(1) and 310(2) to be used in combination, a dual-port fiber channel controller according to the present invention also provides the benefit of allowing standard, commercially-available double-fiber Fibre Channel cables to be used in daisy-chain, loop or similar SAN architectures. In such SAN architectures, unlike a point-to-point architecture, only one of the fibers is normally used in linking Fibre Channel devices. Thus, a Fibre Channel cable must normally be split in such applications, or a single fiber cable used. Splitting of a double-fiber cable incurs the extra time and cost associated with splitting the Fibre Channel cable, and increases the possibility of damaging the optical fibers within. Use of a single-fiber cable (either from a split double-fiber cable or a commercially available single-fiber cable) is an awkward solution because such a solution doubles the number of cables used in a given network, increasing the likelihood of misconnection, misrouting, fiber damage and the like. Alternatively, if double-fiber cables are used (i.e., single-fiber cables are not used), then an external hub must be used, incurring the disadvantages previously discussed.

A dual-port fiber channel controller according to the present invention solves these and other such problems. Such a dual-port fiber channel controller permits the construction of multi-device loops using standard double-fiber Fibre Channel cables without requiring the use of an external hub. The previously identified advantages, with regard to cost, flexibility, compatibility of devices, scalability, avoidance of bottlenecks and other such criteria, of an architecture that does not use external hubs are thus provided. Further, the cabling of a Fibre Channel network employing a dual-port Fibre Channel controller of the present invention is simplified by such a controller's support for double-fiber Fibre Channel cables.

Exemplary Storage Area Network Using Dual-Port Fibre Channel Controllers

Figure 5:
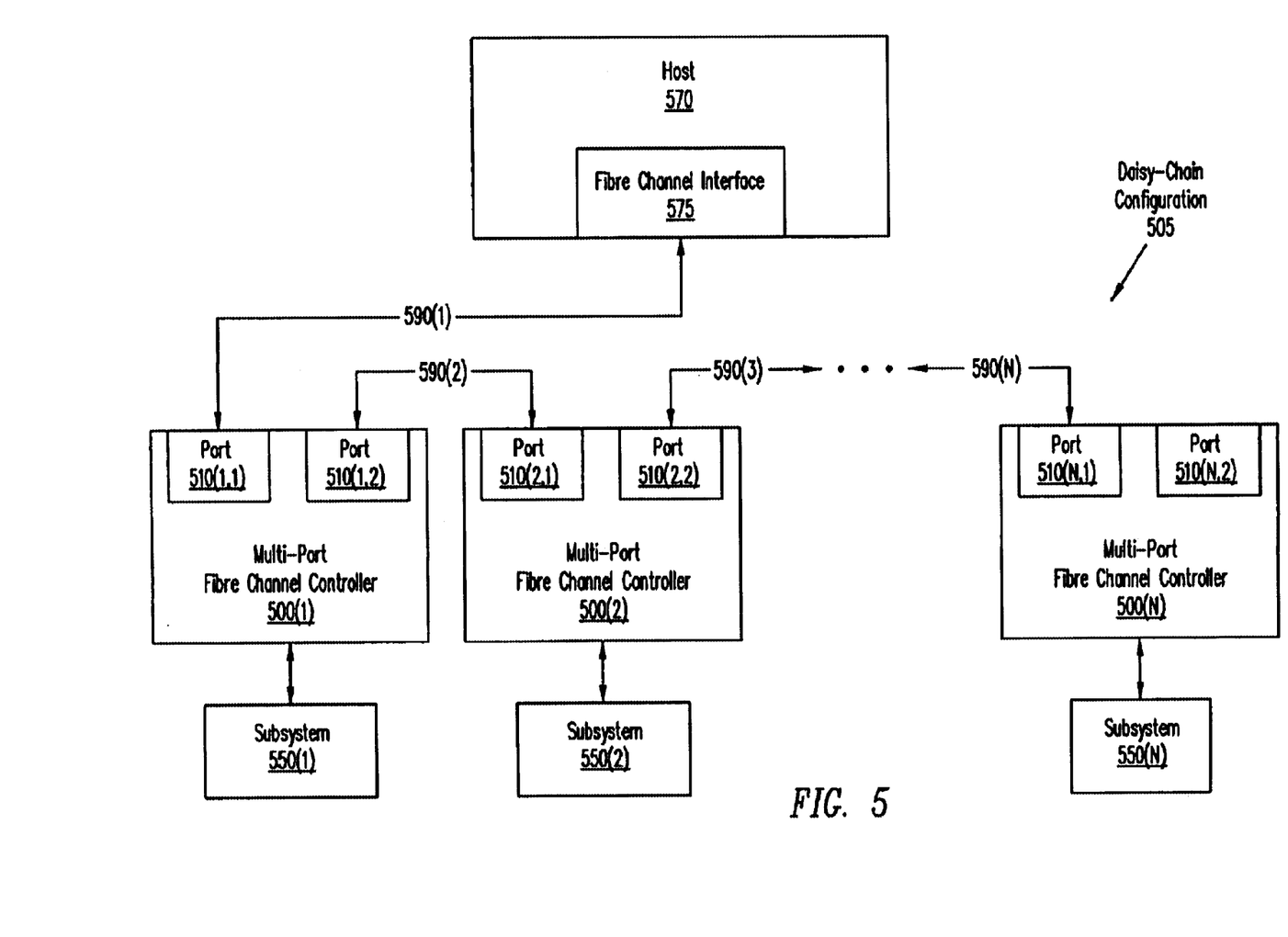
FIG. 5 is a block diagram illustrating a SAN employing an embodiment of the present invention and configured in a 'daisy-chain' configuration.

FIG. 5 is a block diagram illustrating the ability to daisy-chain multiple storage routers together and couple them to a host system when using a dual-port Fibre Channel controller according to the present invention. FIG. 5 depicts a number of multi-port Fiber Channel controllers 500(1)–(N) coupled to one another in a daisychain configuration 505. Multi-port Fibre Channel controllers 500(1)–(N) are also coupled to subsystems 550(1)–(N), respectively. Multi-port Fibre Channel controller 500(1) is also coupled to a host system 570, specifically to a Fibre Channel interface 575 of host system 570, by a link 590(1). It will be understood by one of skill in the art that any one of multi-port Fiber Channel controllers 500(1)–(N) may be so coupled. Multi-port Fiber Channel controllers 500(1)–(N) are coupled to one another by links 590(2)–(N). For example, multi-port Fibre Channel controller 500(1) is coupled to multi-port Fibre Channel controller 500(2) by link 590(2) between ports 510(1,2) and 510(2,1). Each of multi-port Fiber Channel controllers 500(1)–(N) in the daisy-chain is coupled, in turn, to the next one of multi-port Fiber Channel controllers 500(1)–(N) via a similar port-to-port link (i.e., links 590(2)–(N)).

A computer system such as host 570 can be of any design, in general. Such computer systems may be one of a variety of types, including a mainframe, a minicomputer or a personal computer system, which may include a system unit having a system processor and associated volatile and non-volatile memory, one or more display monitors and keyboards, one or more diskette drives, one or more fixed disk storage devices and one or more printers. These computer systems are information handling systems which are designed to provide computing power to one or more users, either locally or remotely. Such a computer system may also include one or a plurality of I/O devices (i.e. peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. The preceding discussion applies equally to a storage router or other network element to which a multi-port Fibre Channel controller according to an embodiment of the present invention might be attached.

The configuration depicted in FIG. 5 allows multi-port Fibre Channel controllers 500(1)–(N) to communicate and transfer data among and between themselves, as well as with host 570. Such a configuration provides the added redundancy and scalability that is presently only possible with the use of additional external devices, such as an external hub. The SAN architecture depicted in FIG. 5 can be extended to form a 'loop' architecture as is shown in FIG. 6.

Figure 6:
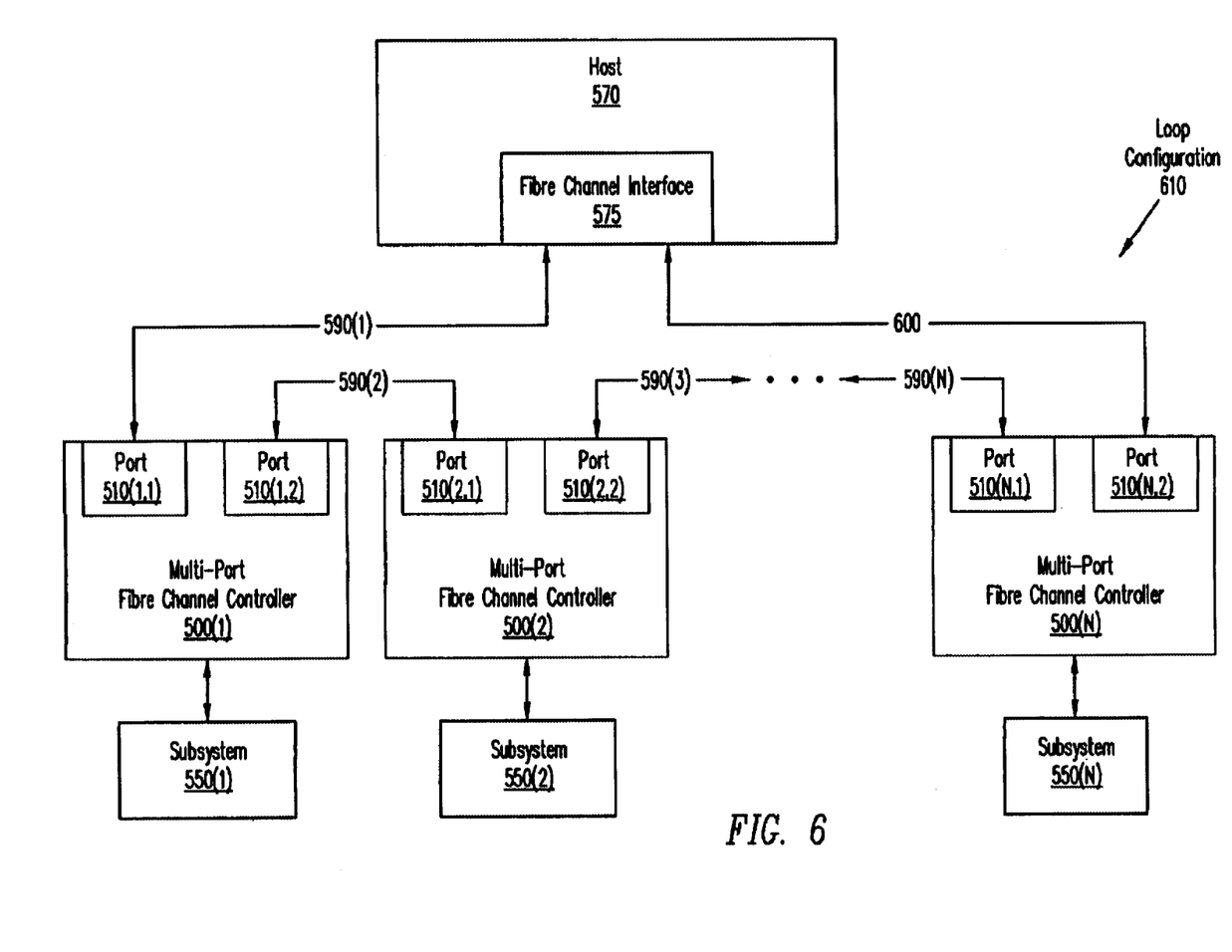
FIG. 6 is a block diagram illustrating a SAN employing an embodiment of the present invention and configured in a 'loop' configuration.

FIG. 6 is a block diagram illustrating an example in which a Fibre Channel link, such as link 600, is coupled to a port, such as port 510(N,2), of a Fibre Channel controller device preferably at or near the end of a daisy-chain, such as device 500(N), in order to form a loop configuration 610. Link 600 can, for example (and as shown), couple port 510(N,2) (or that of another storage router at or near the other end of the daisy-chain) to Fibre Channel interface 575 of host 570. The advantages of forming such a loop include greater redundancy and fault-tolerance in a SAN employing such dual-port Fibre Channel controllers. Once again, loop configuration 610 can be constructed without recourse to an external hub or single-fiber cabling by using a dual-port Fibre Channel controller according to the present invention.

Figure 7:
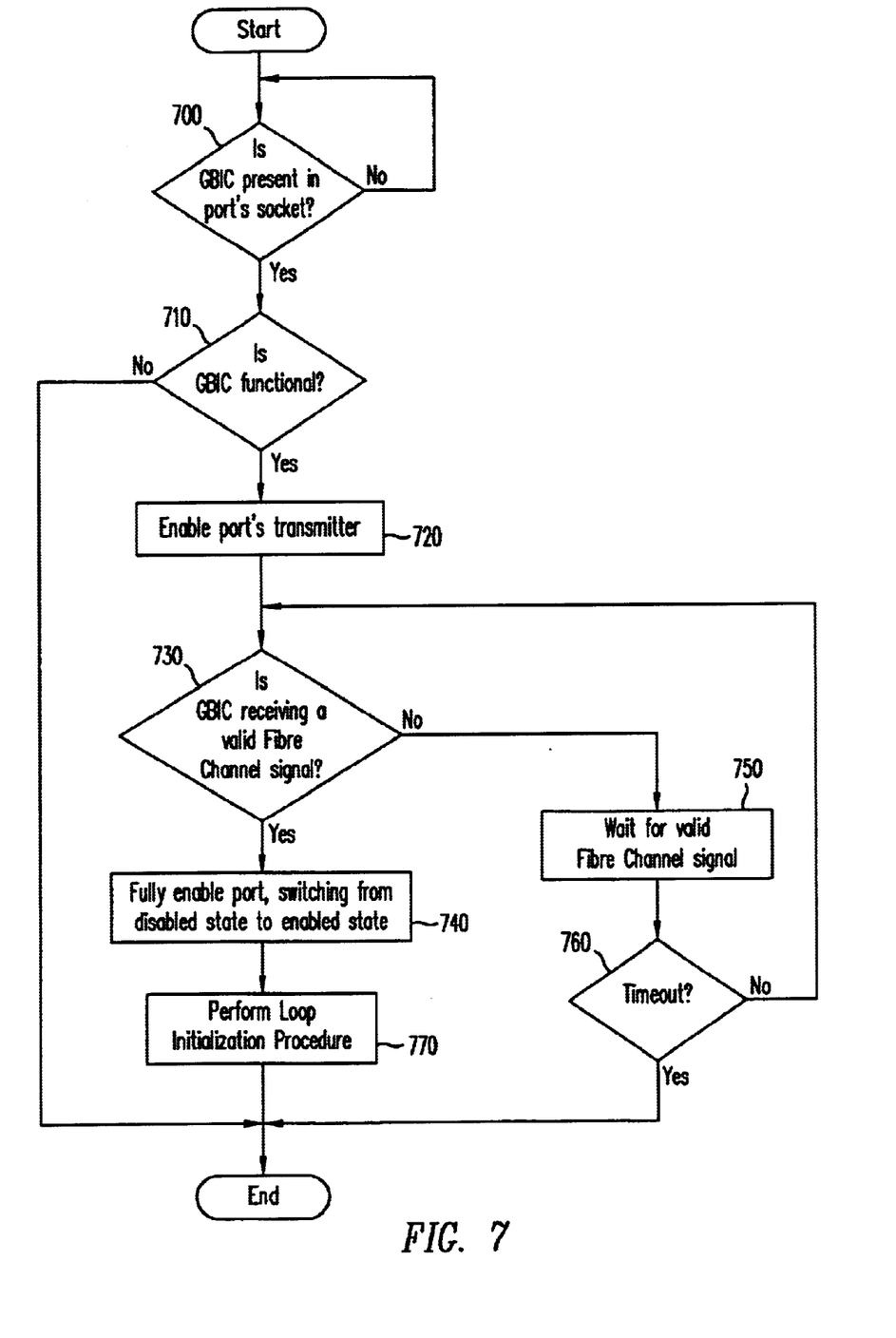
FIG. 7 is a flowchart illustrating a method according to an embodiment of the present invention.

FIG. 7 depicts a flow diagram illustrating a method according to one embodiment of the present invention. The hardware for each Fibre Channel port includes detectors which report whether a gigabit interface controller (GBIC, which contains a connector, Fibre Channel transceivers and associated hardware, and are exemplary (in part) of ports 1 10(1)–(N) of FIG. 1) is present in the port's socket and functional, and detectors which report whether the GBIC is receiving a valid Fibre Channel signal at the GBIC's receiving port. The controlling software is able to sense and respond to these signals. (Each of these two logical signals is in fact made up of more than one physical hardware signal, allowing the software to choose between different criteria for differentiating the various GBIC states.) The software controls two hardware signals for each port which respectively enable the GBIC's transmitter, and fully enable the port to participate on the Arbitrated Loop. Normally, a port is not enabled without also enabling the port's transmitter. Either port, when its transmitter is enabled but the port is disabled, will transmit what is being emitted from the transmitter of the storage router's Fibre Channel controller IC (i.e. a valid Fibre Channel signal). The port's input is basically discarded, save for checking the input's validity. When one port is enabled, the port's input is presented to the receiver of the Fibre Channel controller. When both ports are enabled, port 1 transmits the Fibre Channel controller's output while port 2 transmits port 1's input. Port 2's input is routed to the receiver of the Fibre Channel controller.

Referring again to FIG. 7, if control software detects that a GBIC is present (step 700) and functional (step 710), then the software enables that GBIC's transmitter (step 720). If the software further detects that the GBIC is receiving a valid Fibre Channel signal (step 730), then the software fully enables that port (step 740). If a valid Fibre Channel signal is not detected (step 730), then the software waits for a valid Fibre Channel signal (step 750) unless the software times out wait for such a signal (step 760). Any time a port is switched from disabled to enabled (or vice versa), the configuration of the loop may have changed. The software requests that the Fibre Channel controller begin a loop initialization procedure (LIP) (step 770). The LIP allows the software (with the assistance of the controller) to detect and recover from any configuration change. The LIP also alerts other devices on the loop that a configuration change may have occurred.

FIG. 7 depicts a flow chart of the operation of a module and method for operating a dual-port Fibre Channel controller according to an embodiment of the invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule. Furthermore, those skilled in the art will recognize that the operations described in exemplary embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of FIG. 7 may be executed by a module (e.g., a software module) or a portion of a module or a computer system user using, for example, a computer system such as the storage router previously mentioned, or a similar network element, as well as a computer system such as host 570. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media; optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; volatile storage media including registers, buffers or caches, main memory, RAM, etc.; and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A multi-port Fibre Channel controller comprising:

a plurality of Fibre Channel ports;

an interface unit coupled to each one of said plurality of Fibre Channel ports;

a Fibre Channel controller coupled to control said interface unit; and a processor, wherein said processor is coupled to said Fibre Channel controller, wherein said plurality of Fibre Channel ports consists of a first Fibre Channel port and a second Fibre Channel port, said multi-port Fibre Channel controller is a dual-port Fibre Channel controller, said interface unit is a switch, said first Fibre Channel port includes an inbound link and an outbound link, said second Fibre Channel port includes an inbound link and an outbound link, said switch is configured to couple said inbound link of said first Fibre Channel port to an inbound link of said Fibre Channel controller, said switch is configured to couple said inbound link of said second Fibre Channel port to said outbound link of said first Fibre Channel port, and said switch is configured to couple an outbound link of said Fibre Channel controller to said outbound link of said second Fibre Channel port.

2. A multi-port Fibre Channel controller comprising:

a plurality of Fibre Channel ports;

an interface unit coupled to each one of said plurality of Fibre Channel ports;

a Fibre Channel controller coupled to control said interface unit; and a processor, wherein said processor is coupled to said Fibre Channel controller, wherein said plurality of Fibre Channel ports consists of a first Fibre Channel port and a second Fibre Channel port, said multi-port Fibre Channel controller is a dual-port Fibre Channel controller, said first Fibre Channel port is coupled to a Fibre Channel interface of a host computer, said dual-port Fibre Channel controller is a first one of a plurality of such dual-port Fibre Channel controllers, each one of said plurality of such dual-port Fibre Channel controllers comprises a first Fibre Channel port and a second Fibre Channel port, and said second Fibre Channel port of said each one of said plurality of such dual-port Fibre Channel controllers is coupled to said first Fibre Channel port of a next one of said plurality of such dual-port Fibre Channel controllers.

3. The apparatus of claim 2, wherein an outbound link of said second Fibre Channel port of said each one of said plurality of such dual-port Fibre Channel controllers is coupled to an inbound link of said first Fibre Channel port of said next one of said plurality of such dual-port Fibre Channel controllers, and an inbound link of said second Fibre Channel port of said each one of said plurality of such dual-port Fibre Channel controllers is coupled to an outbound link of said first Fibre Channel port of said next one of said plurality of such dual-port Fibre Channel controllers.

4. The apparatus of claim 2, wherein said second Fibre Channel port of a last one of said plurality of such dual-port Fibre Channel controllers is unused.

5. The apparatus of claim 4, wherein an outbound link of said second Fibre Channel port of said each one of said plurality of such dual-port Fibre Channel controllers is coupled to an inbound link of said first Fibre Channel port of said next one of said plurality of such dual-port Fibre Channel controllers, and an inbound link of said second Fibre Channel port of said each one of said plurality of such dual-port Fibre Channel controllers is coupled to an outbound link of said first Fibre Channel port of said next one of said plurality of such dual-port Fibre Channel controllers.

6. The apparatus of claim 2, wherein said second Fibre Channel port of a last one of said plurality of such dual-port Fibre Channel controllers is coupled to said Fibre Channel interface of said host computer.

7. The apparatus of claim 6, wherein an outbound link of said second Fibre Channel port of said each one of said plurality of such dual-port Fibre Channel controllers is coupled to an inbound link of said first Fibre Channel port of said next one of said plurality of such dual-port Fibre Channel controllers, and an inbound link of said second Fibre Channel port of said each one of said plurality of such dual-port Fibre Channel controllers is coupled to an outbound link of said first Fibre Channel port of said next one of said plurality of such dual-port Fibre Channel controllers.

8. The apparatus of claim 2, wherein said dual-port Fibre Channel controller is a first one of a plurality of such dual-port Fibre Channel controllers, and each one of said plurality of such dual-port Fibre Channel controllers is coupled to another of said plurality of such dual-port Fibre Channel controllers such that said plurality of such dual-port Fibre Channel controllers is in a daisy-chain configuration.

9. The apparatus of claim 2, wherein said dual-port Fibre Channel controller is a first one of a plurality of such dual-port Fibre Channel controllers, a last one of said plurality of such dual-port Fibre Channel controllers is coupled to said Fibre Channel interface of said host computer, and each one of said plurality of said dual-port Fibre Channel controllers is coupled to another of said plurality of such dual-port Fibre Channel controllers such that said plurality of said dual-port Fibre Channel controllers is in a loop configuration.

10. A method of operating a multi-port Fibre Channel controller, said multi-port Fibre Channel controller including a plurality of ports, comprising:

determining a state of an interface controller;

configuring a port, wherein said interface controller is associated with said port and said port is one of said plurality of ports;

determining if said interface controller is receiving a Fibre Channel signal that is valid, wherein said interface controller is configured to receive said Fibre Channel signal; and enabling said port if said Fibre Channel signal is valid.

11. The method of claim 10, wherein said multi-port Fibre Channel controller is a dual-port Fibre Channel controller.

12. The method of claim 11, wherein dual-port Fibre Channel controller comprises:

a first Fibre Channel port and a second Fibre Channel port;

an interface unit coupled to each one of said first and said second Fibre Channel ports;

a Fibre Channel controller coupled to control said interface unit; and a processor, wherein said processor is coupled to said Fibre Channel controller.

13. The method of claim 10, wherein said interface controller is a gigabit interface controller.

14. The method of claim 10, wherein said determining said state comprises:

determining if said interface controller is present in a socket of said port; and determining if said interface controller is functional.

15. The method of claim 14, wherein said state is one of a plurality of states and said configuring comprises:

enabling a transmitter of said port, if said state is a first one of said plurality of states.

16. The method of claim 15, wherein said first one of said plurality of states indicates that said interface is present in said socket of said port and that said interface is functional.

17. The method of claim 15, wherein said multi-port Fibre Channel controller includes a Fibre Channel controller and said method further comprises:

causing said transmitter of said port to transmit a signal, said signal transmitted by a transmitter of said Fibre Channel controller, if said transmitter of said port is enabled and said port is not enabled.

18. The method of claim 15, wherein said multi-port Fibre Channel controller includes a Fibre Channel controller and said method further comprises:

causing said transmitter of said port to transmit a first signal, said first signal transmitted by a transmitter of said Fibre Channel controller, if said transmitter of said port is enabled; and causing a receiver of said Fibre Channel controller to receive a second signal received by a receiver of said port, if said transmitter of said port is enabled, said port is enabled and said port is an only one of said plurality of ports that is enabled.

19. The method of claim 15, wherein said multi-port Fibre Channel controller includes a Fibre Channel controller, said port is enabled, another port of said plurality of ports is enabled and said method further comprises:

causing said transmitter of said port to transmit a first signal, said first signal transmitted by a transmitter of said Fibre Channel controller;

causing a receiver of said Fibre Channel controller to receive a second signal received by a receiver of said another port; and causing a transmitter of said another port to transmit a third signal received by a receiver of said port.

20. The method of claim 10, further comprising:

causing said multi-port Fibre Channel controller to perform an initialization procedure.

21. The method of claim 20, wherein said initialization procedure is a loop initialization procedure.

22. A computer system comprising:

a multi-port Fibre Channel controller, said multi-port Fibre Channel controller including a processor and a plurality of ports;

computer readable medium coupled to said processor; and computer code, encoded in said computer readable medium, configured to cause said processor to:
- determine a state of an interface controller;
- configure a port, wherein said interface controller is associated with said port and said port is one of said plurality of ports;
- determine if said interface controller is receiving a Fibre Channel signal that is valid, wherein said interface controller is configured to receive said Fibre Channel signal; and
- enable said port if said Fibre Channel signal is valid.

23. The computer system of claim 22, wherein said computer code configured to cause said processor to determine said state is further configured to cause said processor to:
- determine if said interface controller is present in a socket of said port; and
- determine if said interface controller is functional.

24. The computer system of claim 23, wherein said state is one of a plurality of states and said computer code configured to cause said processor to configure said port is further configured to cause said processor to:
- enable a transmitter of said port, if said state is a first one of said plurality of states.

25. The computer system of claim 24, wherein said first one of said plurality of states indicates that said interface is present in said socket of said port and that said interface is functional.

26. The computer system of claim 24, wherein said multi-port Fibre Channel controller includes a Fibre Channel controller and said computer code is further configured to cause said processor to:
- cause said transmitter of said port to transmit a signal, said signal transmitted by a transmitter of said Fibre Channel controller, if said transmitter of said port is enabled and said port is not enabled.

27. The computer system of claim 24, wherein said multi-port Fibre Channel controller includes a Fibre Channel controller and said computer code is further configured to cause said processor to:
- cause said transmitter of said port to transmit a first signal, said first signal transmitted by a transmitter of said Fibre Channel controller, if said transmitter of said port is enabled; and
- cause a receiver of said Fibre Channel controller to receive a second signal received by a receiver of said port, if said transmitter of said port is enabled, said port is enabled and said port is an only one of said plurality of ports that is enabled.

28. The computer system of claim 24, wherein said multi-port Fibre Channel controller includes a Fibre Channel controller, said port is enabled, another port of said plurality of ports is enabled and said computer code is further configured to cause said processor to:
- cause said transmitter of said port to transmit a first signal, said first signal transmitted by a transmitter of said Fibre Channel controller;
- cause a receiver of said Fibre Channel controller to receive a second signal received by a receiver of said another port; and
- cause a transmitter of said another port to transmit a third signal received by a receiver of said port.

29. The computer system of claim 22, wherein said computer code is further configured to cause said processor to:
- cause said multi-port Fibre Channel controller to perform an initialization procedure.

30. The computer system of claim 29, wherein said initialization procedure is a loop initialization procedure.

31. A multi-port Fibre Channel controller comprising:
- a plurality of Fibre Channel ports, wherein said plurality of Fibre Channel ports consists of a first Fibre Channel port and a second Fibre Channel port, and said multi-port Fibre Channel controller is a dual-port Fibre Channel controller;
- an interface unit coupled to each one of said plurality of Fibre Channel ports, wherein said interface unit is a switch;
- a Fibre Channel controller coupled to control said interface unit; and
- a processor, wherein said processor is coupled to said Fibre Channel controller, wherein
  - said first Fibre Channel port includes an inbound link and an outbound link,
  - said second Fibre Channel port includes an inbound link and an outbound link,
  - said switch is configured to couple said inbound link of said first Fibre Channel port to an inbound link of said Fibre Channel controller,
  - said switch is configured to couple said inbound link of said second Fibre Channel port to said outbound link of said first Fibre Channel port, and
  - said switch is configured to couple an outbound link of said Fibre Channel controller to said outbound link of said second Fibre Channel port.

32. A multi-port Fibre Channel controller comprising:
- a plurality of Fibre Channel ports, wherein said plurality of Fibre Channel ports consists of a first Fibre Channel port and a second Fibre Channel port, and said multi-port Fibre Channel controller is a dual-port Fibre Channel controller;
- an interface unit coupled to each one of said plurality of Fibre Channel ports, wherein said interface unit is a switch;
- a Fibre Channel controller coupled to control said interface unit; and
- a processor, wherein said processor is coupled to said Fibre Channel controller, wherein
  - said first Fibre Channel port includes an inbound link and an outbound link,
  - said second Fibre Channel port includes an inbound link and an outbound link,
  - said switch is configured to couple an outbound link of said Fibre Channel controller to said outbound link of said first Fibre Channel port,
  - said switch is configured to couple said inbound link of said first Fibre Channel port to said outbound link of said second Fibre Channel port, and
  - said switch is configured to couple said inbound link of said second Fibre Channel port to an inbound link of said Fibre Channel controller.

33. A multi-port Fibre Channel controller comprising:
- a plurality of Fibre Channel ports, wherein
  - said plurality of Fibre Channel ports consists of a first Fibre Channel port and a second Fibre Channel port,
  - said multi-port Fibre Channel controller is a dual-port Fibre Channel controller, and
  - said first Fibre Channel port is coupled to a Fibre Channel interface of a host computer;
- an interface unit coupled to each one of said plurality of Fibre Channel ports;

a Fibre Channel controller coupled to control said interface unit; and a processor, wherein said processor is coupled to said Fibre Channel controller, wherein said dual-port Fibre Channel controller is a first one of a plurality of such dual-port Fibre Channel controllers, each one of said plurality of such dual-port Fibre Channel controllers comprises a first Fibre Channel port and a second Fibre Channel port, and said second Fibre Channel port of said each one of said plurality of such dual-port Fibre Channel controllers is coupled to said first Fibre Channel port of a next one of said plurality of such dual-port Fibre Channel controllers.

34. The apparatus of claim 33, wherein an outbound link of said second Fibre Channel port of said each one of said plurality of such dual-port Fibre Channel controllers is coupled to an inbound link of said first Fibre Channel port of said next one of said plurality of such dual-port Fibre Channel controllers, and an inbound link of said second Fibre Channel port of said each one of said plurality of such dual-port Fibre Channel controllers is coupled to an outbound link of said first Fibre Channel port of said next one of said plurality of such dual-port Fibre Channel controllers.

35. The apparatus of claim 33, wherein said second Fibre Channel port of a last one of said plurality of such dual-port Fibre Channel controllers is unused.

36. The apparatus of claim 35, wherein an outbound link of said second Fibre Channel port of said each one of said plurality of such dual-port Fibre Channel controllers is coupled to an inbound link of said first Fibre Channel port of said next one of said plurality of such dual-port Fibre Channel controllers, and an inbound link of said second Fibre Channel port of said each one of said plurality of such dual-port Fibre Channel controllers is coupled to an outbound link of said first Fibre Channel port of said next one of said plurality of such dual-port Fibre Channel controllers.

37. The apparatus of claim 33, wherein said second Fibre Channel port of a last one of said plurality of such dual-port Fibre Channel controllers is coupled to said Fibre Channel interface of said host computer.

38. The apparatus of claim 37, wherein an outbound link of said second Fibre Channel port of said each one of said plurality of such dual-port Fibre Channel controllers is coupled to an inbound link of said first Fibre Channel port of said next one of said plurality of such dual-port Fibre Channel controllers, and an inbound link of said second Fibre Channel port of said each one of said plurality of such dual-port Fibre Channel controllers is coupled to an outbound link of said first Fibre Channel port of said next one of said plurality of such dual-port Fibre Channel controllers.

39. The apparatus of claim 33, wherein said dual-port Fibre Channel controller is a first one of a plurality of such dual-port Fibre Channel controllers, and each one of said plurality of such dual-port Fibre Channel controllers is coupled to another of said plurality of such dual-port Fibre Channel controllers such that said plurality of such dual-port Fibre Channel controllers is in a daisy-chain configuration.

40. The apparatus of claim 33, wherein said dual-port Fibre Channel controller is a first one of a plurality of such dual-port Fibre Channel controllers, a last one of said plurality of such dual-port Fibre Channel controllers is coupled to said Fibre Channel interface of said host computer, and each one of said plurality of said dual-port Fibre Channel controllers is coupled to another of said plurality of such dual-port Fibre Channel controllers such that said plurality of said dual-port Fibre Channel controllers is in a loop configuration.

41. The apparatus of claim 33, wherein said dual-port Fibre Channel controller further comprises a subsystem interface configured to interface said dual-port Fibre Channel controller to a subsystem.

42. The apparatus of claim 41, wherein said subsystem is a storage subsystem.

43. A method of operating a multi-port Fibre Channel controller, said multi-port Fibre Channel controller including a plurality of ports, comprising:

determining a state of an interface controller, wherein said interface controller is a gigabit interface controller;

configuring a port, wherein said interface controller is associated with said port and said port is one of said plurality of ports;

determining if said interface controller is receiving a Fibre Channel signal that is valid, wherein said interface controller is configured to receive said Fibre Channel signal; and enabling said port if said Fibre Channel signal is valid.

44. The method of claim 43, wherein said multi-port Fibre Channel controller is a dual-port Fibre Channel controller.

45. The method of claim 44, wherein dual-port Fibre Channel controller comprises:

a first Fibre Channel port and a second Fibre Channel port;

an interface unit coupled to each one of said first and said second Fibre Channel ports;

a Fibre Channel controller coupled to control said interface unit and coupled to said subsystem interface; and a processor, wherein said processor is coupled to said Fibre Channel controller.

46. The method of claim 43 wherein said determining said state comprises:

determining if said interface controller is present in a socket of said port; and determining if said interface controller is functional.

47. The method of claim 46, wherein said state is one of a plurality of states and said configuring comprises:

enabling a transmitter of said port, if said state is a first one of said plurality of states.

48. The method of claim 47, wherein said first one of said plurality of states indicates that said interface is present in said socket of said port and that said interface is functional.

49. The method of claim 47, wherein said multi-port Fibre Channel controller includes a Fibre Channel controller and said method further comprises:

causing said transmitter of said port to transmit a signal, said signal transmitted by a transmitter of said Fibre Channel controller, if said transmitter of said port is enabled and said port is not enabled.

50. The method of claim 47, wherein said multi-port Fibre Channel controller includes a Fibre Channel controller and said method further comprises:

causing said transmitter of said port to transmit a first signal, said first signal transmitted by a transmitter of said Fibre Channel controller, if said transmitter of said port is enabled; and causing a receiver of said Fibre Channel controller to receive a second signal received by a receiver of said port, if said transmitter of said port is enabled, said port is enabled and said port is an only one of said plurality of ports that is enabled.

51. The method of claim 47, wherein said multi-port Fibre Channel controller includes a Fibre Channel controller, said port is enabled, another port of said plurality of ports is enabled and said method further comprises:

causing said transmitter of said port to transmit a first signal, said first signal transmitted by a transmitter of said Fibre Channel controller;

causing a receiver of said Fibre Channel controller to receive a second signal received by a receiver of said another port; and causing a transmitter of said another port to transmit a third signal received by a receiver of said port.

52. A computer system comprising:

a multi-port Fibre Channel controller, said multi-port Fibre Channel controller including a processor and a plurality of ports;

computer readable medium coupled to said processor; and computer code, encoded in said computer readable medium, configured to cause said processor to:
  determine a state of an interface controller by virtue of being configured to cause said processor to
    determine if said interface controller is present in a socket of said port, and
    determine if said interface controller is functional
  configure a port, wherein said interface controller is associated with said port and said port is one of said plurality of ports;
  determine if said interface controller is receiving a Fibre Channel signal that is valid, wherein said interface controller is configured to receive said Fibre Channel signal; and
  enable said port if said Fibre Channel signal is valid.

53. The computer system of claim 52, wherein said state is one of a plurality of states and said computer code is configured to cause said processor to configure said port is further configured to cause said processor to:

enable a transmitter of said port, if said state is a first one of said plurality of states.

54. The computer system of claim 53, wherein said first one of said plurality of states indicates that said interface is present in said socket of said port and that said interface is functional.

55. The computer system of claim 53, wherein said multi-port Fibre Channel controller includes a Fibre Channel controller and said computer code is further configured to cause said processor to:

cause said transmitter of said port to transmit a signal, said signal transmitted by a transmitter of said Fibre Channel controller, if said transmitter of said port is enabled and said port is not enabled.

56. The computer system of claim 53, wherein said multi-port Fibre Channel controller includes a Fibre Channel controller and said computer code is further configured to cause said processor to:

cause said transmitter of said port to transmit a first signal, said first signal transmitted by a transmitter of said Fibre Channel controller, if said transmitter of said port is enabled; and cause a receiver of said Fibre Channel controller to receive a second signal received by a receiver of said port, if said transmitter of said port is enabled, said port is enabled and said port is an only one of said plurality of ports that is enabled.

57. The computer system of claim 53, wherein said multi-port Fibre Channel controller includes a Fibre Channel controller, said port is enabled, another port of said plurality of ports is enabled and said computer code is further configured to cause said processor to:

cause said transmitter of said port to transmit a first signal, said first signal transmitted by a transmitter of said Fibre Channel controller;

cause a receiver of said Fibre Channel controller to receive a second signal received by a receiver of said another port; and cause a transmitter of said another port to transmit a third signal received by a receiver of said port.

* * * * *